Oct. 6, 1959 J. C. MONDAY 2,907,857
HEATING APPARATUS
Filed Oct. 27, 1954

INVENTOR
John C. Monday
BY
Pollard Johnston Smythe & Robertson
ATTORNEYS

United States Patent Office 2,907,857
Patented Oct. 6, 1959

2,907,857

HEATING APPARATUS

John C. Monday, Pewaukee, Wis., assignor to Hevi Duty Electric Company, Milwaukee, Wis., a corporation of Wisconsin Application October 27, 1954, Serial No. 465,075

2 Claims. (Cl. 219—10.51)

This invention relates to dielectric heating of atmosphere generators and particularly generators useful for supplying a desired atmosphere to heat treating apparatus or the like.

In the treating of materials in various manners, such as steel, brass, etc., frequently it is required that a controlled atmosphere be furnished thereto. For example, in the hardening, brazing, sintering or annealing of high carbon steels, the atmosphere must be precisely controlled. In the case of endothermic atmosphere generators for providing such an atmosphere to a heat treating furnace, a catalyst is held in a retort and gas is passed therethrough, heat being required for the reaction.

One of the objects of the present invention is to provide an improved manner of heating the gas which is to be dissociated in the presence of a catalyst and then used as the atmosphere for heat treating apparatus.

A still further object of the invention is to provide an arrangement wherein gas is reacted in the presence of a catalyst and heat is generated dielectrically.

Another object of the invention is to provide an improved arrangement for supplying a precisely controlled atmosphere to a heat treating furnace or the like.

In industrial processes, heating may be accomplished in various manners by transfer of heat from a body at higher temperature to the material to be heated. This may be done by means of flame heating which frequently produces uneven distribution and is difficult to control. Induction heating also has been used wherein current induced in a conductive material produces heat because of resistance of the material. These processes depend upon the addition of heat increasing the average kinetic energy of the molecules. Dielectric heating produces the necessary molecular motion in a different manner. Molecules are composed of atoms having a positively charged nucleus surrounded by negatively charged electrons.

In the neutral atom, total amounts of positive and negative charge are equal. In some molecules, the "centers of gravity" of positive and negative charge coincides, while in other molecules the centers may be spaced. A molecule of the latter type is called a "permanent molecular dipole." When a non-polar molecule is placed within an electric field, there is a shifting of charge distributions in the molecule, positive charge "down-field" and negative charge "up-field." As a result, the centers of gravity of positive and negative charge no longer coincide, and the molecule becomes a dipole.

Under the influence of an external field, the molecular dipole (permanent or induced), tends to rotate until its axis is parallel to the field. If the field is of an alternating nature, the molecular dipole will oscillate as it follows the alternations of field direction. If a field alternating rapidly enough is applied to a dielectric, the resulting molecular motion is sufficient to generate useful heat within the dielectric. The more rapid the reversal of field (the greater the frequency of the alternating field), the more rapid is the vibration and, in general, the greater the rate of generation of heat. The heating is substantially a frictional effect.

One noteworthy characteristic of dielectric heating is the uniformity of molecular agitation throughout the dielectric. Molecules in the middle of the dielectric are moved back and forth by the alternating field at the same rate as they are anywhere else in the medium. Hence, there should be no overheating at the surface and no underheating at the center.

In one aspect of the invention, a chamber or retort may have means for suplying gas thereto and passing it through a dielectric ceramic in the retort, the gas then being fed to its place of use, the dielectric ceramic being located between two electrode plates, the electrode plates in turn being connected to alternating energy of high frequency. Such an arrangement can be used, for example, for the dissociation of ammonia.

In a preferred form, and for producing "endothermic generator gas," a catalyst is located in the chamber or retort so as to be heated by the dielectric ceramic. The catalyst preferably is deposited on the surfaces of the ceramic material such as by impregnation. Thus, the ceramic serves as a carrier. When high frequency electrical energy is applied to the electrodes, the phenomena known as dielectric heating will take place. Then as the gas to be reacted is passed over the heated dielectric ceramic, catalytic action will take place and the gas will be dissociated or cracked as desired. By the use of dielectric heating, it is possible to provide an accurate control arrangement for control of the operation, particularly when the temperatures involved are high and in the range of 1400° to 2600° F. Also, more uniform temperatures and more uniform heating of the retort and catalyst will result. A lower temperature at the center of the catalyst will be eliminated because the entire body will be heated. This will result in reduction of carbon deposit in an endothermic generator. The construction of the unit will be simplified and high cost heating elements obviated.

These and other objects, advantages and features of the invention will become apparent from the following description and drawings, which are merely exemplary.

Figures 1, 2, 3, 4:
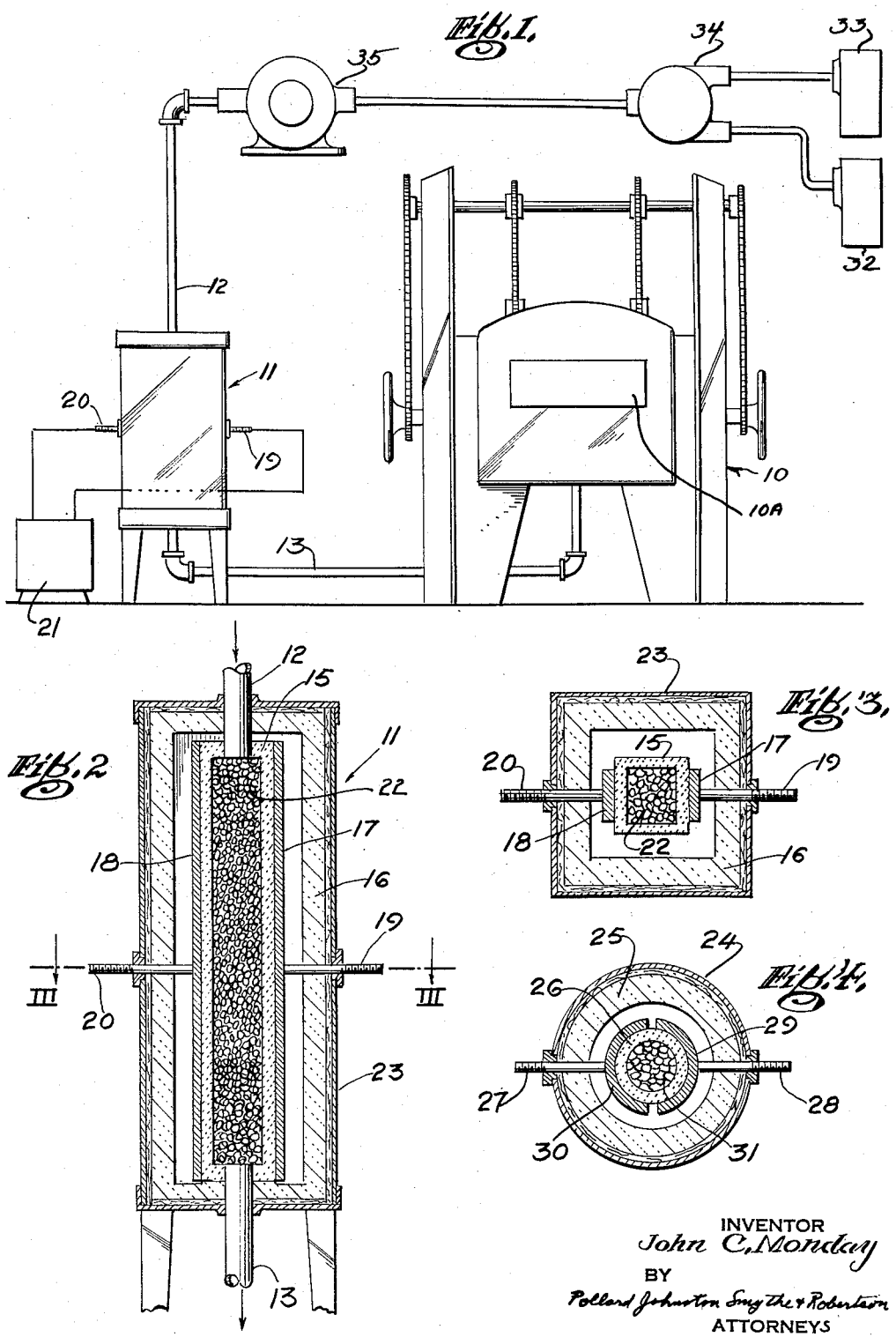
Fig. 1 is a fragmentary, schematic view of the invention in use with a heat treating furnace.
Fig. 2 is an enlarged sectional view of the dielectric atmosphere generator of Fig. 1.
Fig. 3 is a sectional view taken along the line 3—3 of Fig. 2.
Fig. 4 is a cross sectional view of an alternate sectional form of the atmosphere generator.

Furnace 10 (Fig. 1) may be a conventional heat treating furnace which can be heated by electric resistance units or other suitable heating mechanism. The articles to be treated can be placed in said furnace through the access doors 10A.

Atmosphere generator 11 has gas to be reacted fed thereto through inlet line 12, the reacted gas being fed through outlet line 13 to the interior of treating furnace 10. Gas can be exhausted from the electric heat treating chamber 10 through a suitable exhaust connection.

Atmosphere generator 11 may have a dielectric ceramic retort 15 suitably held by insulating material 16, the insulating material being supported by the shell 23 of the atmosphere generator. The shell may be of steel or other suitable material.

Electrodes 17 and 18 may have connected thereto studs 19 and 20 with a high frequency electric energy supply apparatus 21, the supply apparatus being of any conventional design such as one employing electronic tube oscillators. The frequency of the electric energy supply apparatus should be over 1 megacycle and preferably in the range of 10 to 20 megacycles.

Within the ceramic retort 15 may be located the loose dielectric ceramic material 22 (Fig. 2). A "ceramic" may be defined as a product made essentially of clays, rocks, or minerals, or mixtures thereof which are usually treated by firing at high temperatures or its equivalent. As previously mentioned, a dielectric material is a non-conductor. Thus, "dielectric ceramic" refers to a ceramic having dielectric properties.

The ratio of the power loss as heat in a dielectric to the total impressed volt-amperes is known as the power factor of the material. The loss varies directly with the impressed volt-amperes. Since the impedance of a capacitor decreases with increasing frequency, the applied power, and thus the loss, are directly proportional to the frequency at any given voltage. The power factor varies with both temperature and frequency. Gases and pure water have a power factor essentially zero and cannot be heated.

The heat loss in any insulating material due to dielectric losses can be calculated within a reasonable degree of accuracy. If the electrodes are flat, parallel plates, and if the insulating material fills the volume between them, the total capacity can be calculated from:

$$C = \frac{2248 A K}{10^{10} d}$$

where

C is the capacity in microfarads
A is the area of one electrode, in sq. ins.
d is the distance between the electrodes, in ins.
K is the dielectric coefficient The power loss as heat, in watts, can be determined from:

$$W = \frac{2\pi f C E^2 (\text{P.F.})}{10^6}$$

where

W is the power loss as heat (in watts)
f is the frequency of the impressed voltage (cycles/sec.)
C is the capacity (mfd.)
E is the applied voltage (R.M.S.)
P.F. is the power factor The energy (H) required, in watt-minutes, to raise by T degrees Fahrenheit the temperature of a mass M lbs. of material of specific heat S, is given by:

$$H = \frac{10^3 M S \Delta T}{56.9}$$

The above equations hold only for uniform electric fields. Maximum practical impressed voltage is in the range of 14–15 kilovolts (R.M.S.). Increasing the impressed frequency results in an increased heating effect, but such an increased heating requires an increased power input. For a given heating effect the required impressed voltage is inversely proportional to the square root of the frequency.

Gas can be furnished through flowmeter 32 and air through flowmeter 33, the air and gas being mixed in mixing valves 34. Pump 35 is employed to feed the gas to generator 11.

In addition to the flat electrode plate arrangement of Figs. 2 and 3, curved electrodes 29 and 30 as seen in Fig. 4 can be used. Casing 24 carries insulating material 25 and electrode connections 27 and 28. Ceramic retort 26 can have the loose dielectric ceramic 31 located therein in the same manner as described for Figs. 2 and 3.

In a preferred form, the dielectric ceramic is impregnated with the catalyst to be used. As an example, when a hydrocarbon gas and air is to be catalytically dissociated or cracked to form CO, $H_2$ and $N_2$, a trace of water and unreacted $CH_4$, nickel oxide can be used as the catalyst. The commonly used gases are natural or manufactured propane or butane although others can be used. In the dissociation of $NH_3$, the same catalyst can be used although $NH_3$ can be dissociated without the use of a catalyst, the dielectric ceramic furnishing the required heat.

As an example, the material to be placed in the retort may be a ceramic sphere ½" in diameter impregnated with nickel oxide catalyst. Ceramic brick can be cut into cubes and then the cubes soaked in nickel nitrate. After the cubes are saturated, they can be heated at 300° F. to 500° F. so as to drive off $NO_2$ from the nickel nitrate. The nickel oxide catalyst then will remain in the cube. It is obvious the catalyst may be made from other materials in order to produce other atmospheres as needed.

The ceramic retort also will be affected by the electrostatic field so as to produce heat. As an example, the retort may be of silicon carbide.

It should be apparent that details of construction and operation can be changed without departing from the spirit of the invention except as defined in the appended claims.

What is claimed is:

1. In an atmosphere generator for endothermic catalytic dissociation of gas adapted for heat treating apparatus, the combination comprising a housing lined with insulating material, a dielectric material retort chamber within said housing, spaced electrode plates adjacent the outside of said retort chamber, a loose mass of discrete particles of a dielectric ceramic material within said retort chamber, gas inlet means for feeding gas to be treated into said retort chamber through said loose mass of dielectric ceramic material, gas outlet means from said retort chamber feeding reacted gas therefrom, and a source of high frequency electrical current over 1 megacycle connected to said plates for dielectrically heating said mass of dielectric ceramic material and said dielectric material retort chamber to a gas dissociation temperature in the range of 1400° F. to 2600° F.

2. In an atmosphere generator for endothermic catalytic dissociation of gas adapted for heat treating apparatus, the combination comprising a housing lined with insulating material, a dielectric material retort chamber within said housing, spaced electrode plates adjacent the outside of said retort chamber, a loose mass of discrete particles of a dielectric ceramic material within said retort chamber, said particles being impregnated with nickel oxide, gas inlet means for feeding gas to be treated into said retort chamber and through said loose mass of dielectric ceramic material, gas outlet means from said retort chamber feeding reacted gas therefrom, and a source of high frequency electrical current over 1 megacycle connected to said plates for dielectrically heating said mass of dielectric ceramic material and said dielectric material retort chamber to a gas dissociation temperature in the range of 1400° F. to 2600° F.

References Cited in the file of this patent

UNITED STATES PATENTS

| 1,763,229 | Fourment | June 10, 1930 |
| 2,235,401 | Gier | May 18, 1941 |
| 2,432,934 | Rasor | Dec. 16, 1947 |
| 2,486,684 | Schlesman et al. | Nov. 1, 1949 |
| 2,489,135 | Himmel et al. | Nov. 22, 1949 |
| 2,542,028 | Hodge | Feb. 20, 1951 |

OTHER REFERENCES

"Catalysis"; Berkmann, Morrell and Egloff; Reinhold Pub. Corp., N.Y. (1940), page 433 relied on.